(12) United States Patent
Wong

(10) Patent No.: US 6,462,288 B1
(45) Date of Patent: Oct. 8, 2002

(54) METERING DEVICE

(76) Inventor: David Wong, 5F, No. 13, Alley 38, Lane 245, Sec. 2, Szchuan Rd., Pan-Chiao, Taipei Hsien (TW)

( * ) Notice: Subject to any disclaimer, the term of this patent is extended or adjusted under 35 U.S.C. 154(b) by 21 days.

(21) Appl. No.: 09/685,473

(22) Filed: Oct. 10, 2000

(51) Int. Cl.$^7$ .............................................. G01G 13/18
(52) U.S. Cl. ................... 177/105; 177/108; 222/181.1; 222/181.2; 222/505; 222/508; 222/77
(58) Field of Search .............................. 222/77, 55, 56, 222/504, 505, 508, 181.1, 181.2; 177/145, 105, 108, 116, 119, 59, 184, 189; 141/83

(56) References Cited

U.S. PATENT DOCUMENTS

| | | | | |
|---|---|---|---|---|
| 3,540,538 A | * | 11/1970 | Connors et al. | 177/122 |
| 3,578,094 A | * | 5/1971 | Henry et al. | 177/108 |
| 4,393,950 A | * | 7/1983 | Klopfenstein et al. | 177/108 |
| 4,635,831 A | * | 1/1987 | Kinoshia | 222/504 |
| 4,644,786 A | * | 2/1987 | Jacobsen | 177/94 |
| 4,693,355 A | * | 9/1987 | Bochi et al. | 177/18 |
| 5,191,947 A | * | 3/1993 | Peterson | 177/59 |
| 5,379,923 A | * | 1/1995 | Sagastegui et al. | 177/108 |
| 5,637,836 A | * | 6/1997 | Nakagawa et al. | 177/105 |
| 6,188,029 B1 | * | 2/2001 | Miyamoto et al. | 177/105 |

* cited by examiner

*Primary Examiner*—Randy W. Gibson

(57) ABSTRACT

A metering device comprises a scale barrel, a weight part, and a shut mechanism. The scale barrel is composed of a stationary box plate and a movable box plate pivotally connecting with each other. At least a weighing platform is provided at an inner side of the movable box plate. The weight part is disposed at a lateral side of the scale barrel to measure the weight of weighed substances sent into the scale barrel. The shut mechanism is disposed at an outer side of the movable box plate and has a moving rod to open or close the movable box plate. When the movable box plate is in a state of closing, weighed substances can be received in the scale barrel. When the weight of weighed substances in the scale barrel reaches to a predetermined value, the movable box plate may open pivotally to admit the weighed substances entering a packing bag.

3 Claims, 11 Drawing Sheets

METERING DEVICE

BACKGROUND OF THE INVENTION

1. Field of the Invention:

The present invention relates to a metering device, and particularly to a metering device, which provides a weighing platform and is possible to sense and control the weight of delivered substances much more accurately.

2. Description of Related Art:

A prior art of metering device as shown in FIG. 1 provides a feeding funnel a' being disposed above a series of feeding device b' and weighed substances are fed to the feeding devices b' sequentially through the feeding funnel a'. Then, the substances are sent out by way of the feeding device and fall into a scale barrel 10'. A weight part 20' at a lateral side of the scale barrel 10' senses the weight of the weighed substances in the scale barrel 10'. When a predetermined value of weight set up in the weight part 20' is going to reach, the feeding speed may slow down to deliver a very small amount of weighed substance or single weighed substance till the predetermined value exactly reached. At this time, a movable box plate of the shut mechanism c' may open to admit the weighed substances falling down to a packing bag so as to complete the operation of metering. Referring to FIG. 2, a micro-feeding mechanism c' is mounted beside or above a feeding device b'. When the weight part 20' has sensed the predetermined value is going to reach, the feeding device b' stops to deliver the weighed substances such that the micro-feeding mechanism c' then send out a very small amount of weighed substance or single weighed substance slowly. When the predetermined value is exactly reached, the micro-feeding mechanism stops running and the movable box plate 12 of the shut mechanism 30' admits the weighed substances falling down to the packing bag so as to complete the operation of metering.

Referring to FIG. 3, a further conventional metering device provides a rotating threaded rod b1' in the feeding device b' to send weighed substances into the scale barrel 10'. When the weight part 20' has sensed the predetermined value is going to reach, the rotating speed of the threaded rod is slow down to send out a very small amount of weighed substance. When the predetermined value is exactly reached, the threaded rod stops rotating and the movable box plate 12 of the shut mechanism 30' admits the weighed substances falling down to the packing bag so as to complete the operation of metering.

It can be understood that there is a large difference of elevation between the scale barrel 10' and the micro-feeding mechanism c' and/or the feeding device b' for the prior art. That is, weighed substances falling down from the scale barrel 10' to the micro-feeding mechanism and/or the feeding device b' takes a long way. Hence, it may result in a long responding time for measuring weight and a greater acceleration of gravity of the weighed substances. Moreover, these factors affect the accuracy of weight sensing performed by the weight part 20' substantially.

SUMMARY OF THE INVENTION

A main object of the present invention is to provide a metering device, with which a weighing platform at least at a lateral side of the scale barrel is mounted to touch falling weighed substances before the scale barrel receiving the weighed substances. Therefore, a metering operation can be accurately performed and easily controlled.

Another object of the present invention is to provide a metering device, with which a moving rod in the shut mechanism has both ends thereof be pivotally attached by a connecting rod respectively extending along lateral outer sides of the movable box plate. A free end of the connecting rod is provided a groove to fit with a projecting piece on a stationary box plate while the movable box plate is in a state of closing to keep the movable box plate from moving accidentally.

BRIEF DESCRIPTION OF THE DRAWINGS

The other objects and features of the present invention can be more fully understood by referring to the following description of preferred embodiments and accompanying drawing, in which.

DETAILED DESCRIPTION OF THE PREFERRED EMBODIMENTS

Figure 1:
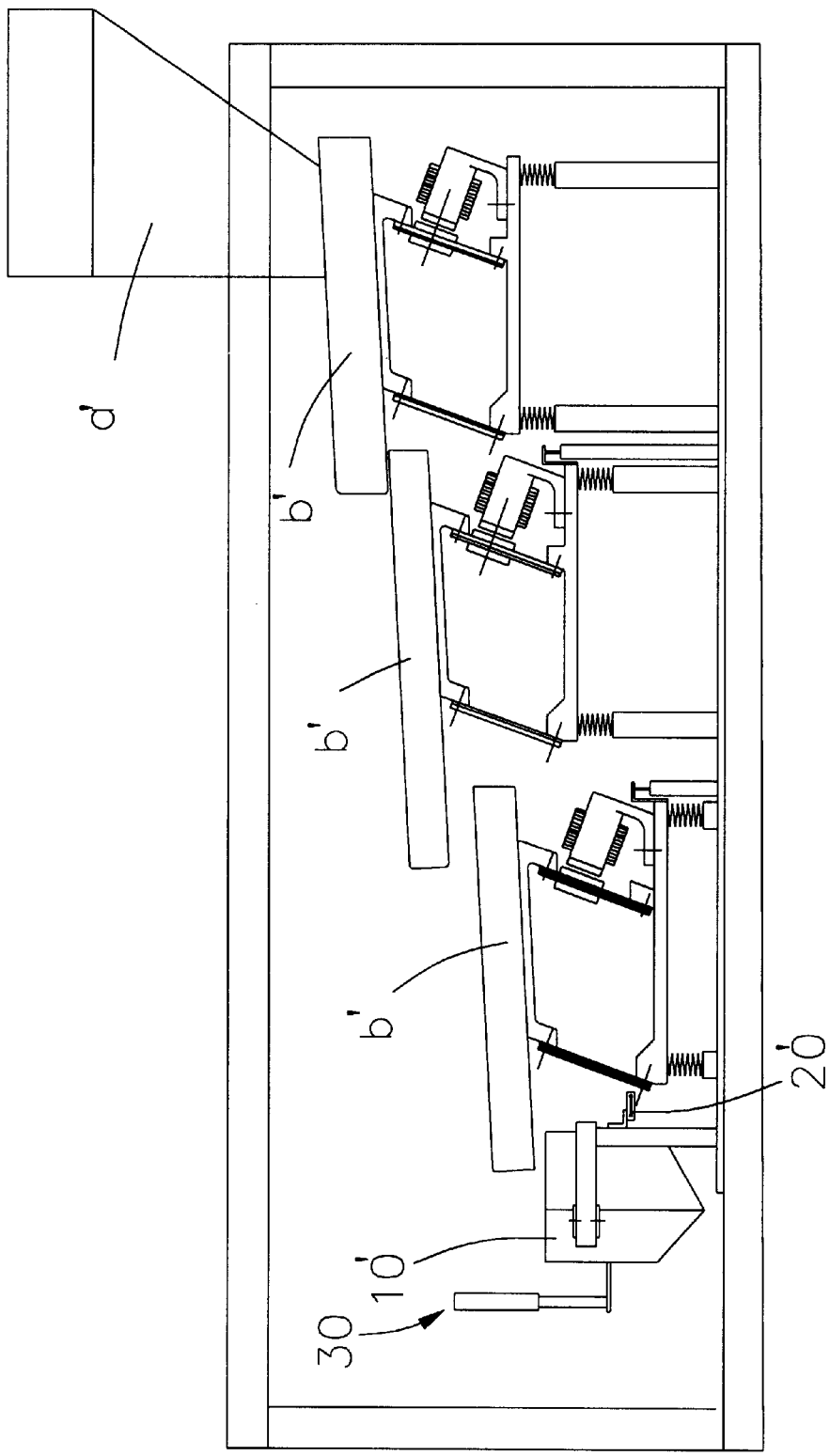
FIG. 1 is a plan view of a conventional metering device in a vibratory feeding machine.
Figure 2:
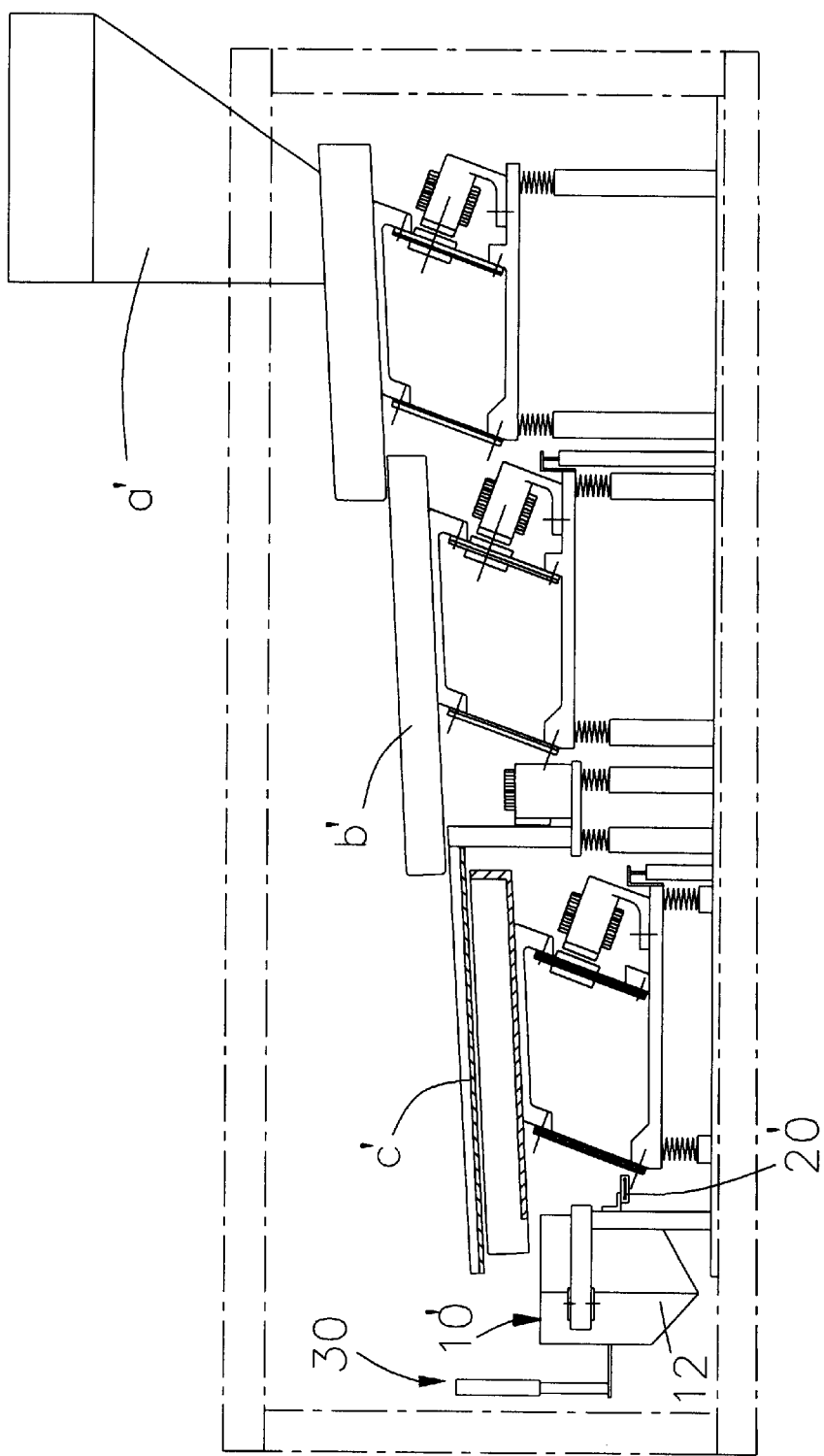
FIG. 2 is a plan view of another conventional metering device in a vibratory feeding machine.
Figure 3:
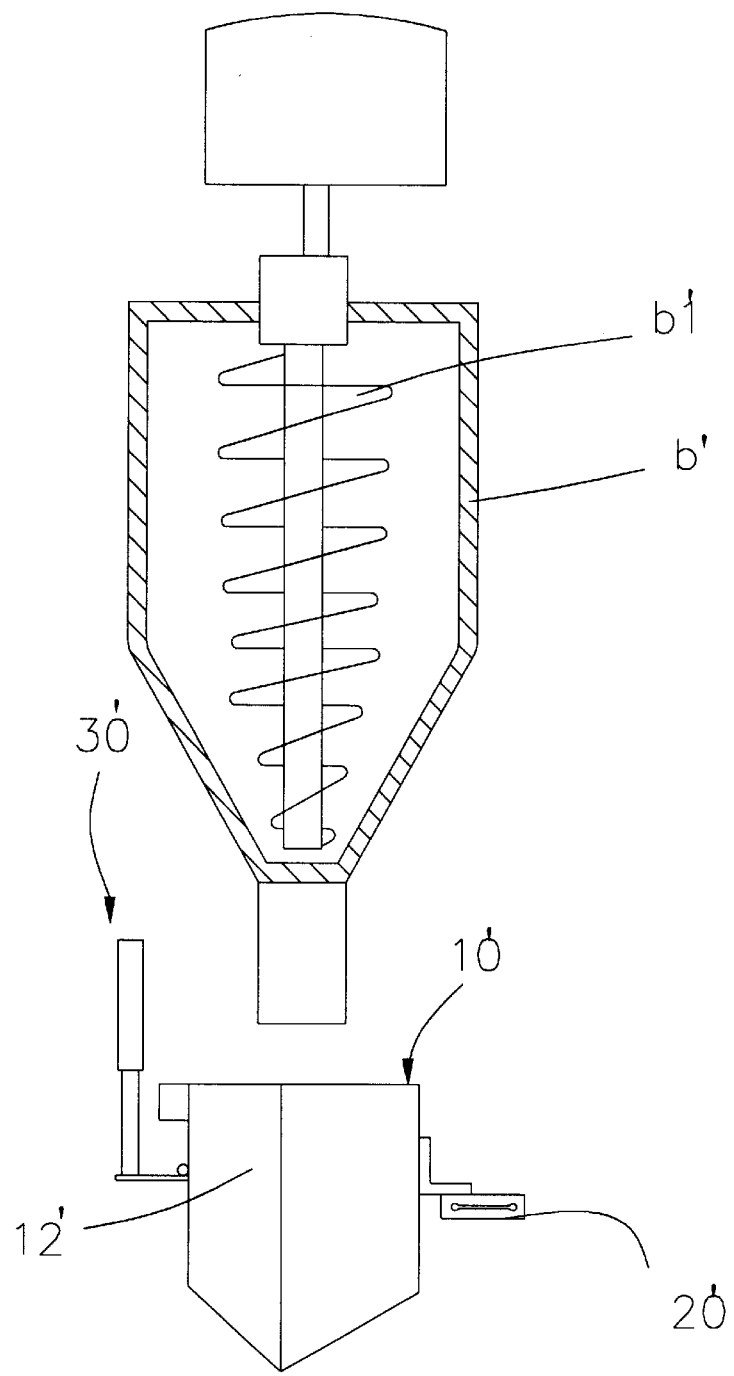
FIG. 3 is a plan view of a conventional metering device in a spiral type of feeding machine.
Figure 4:
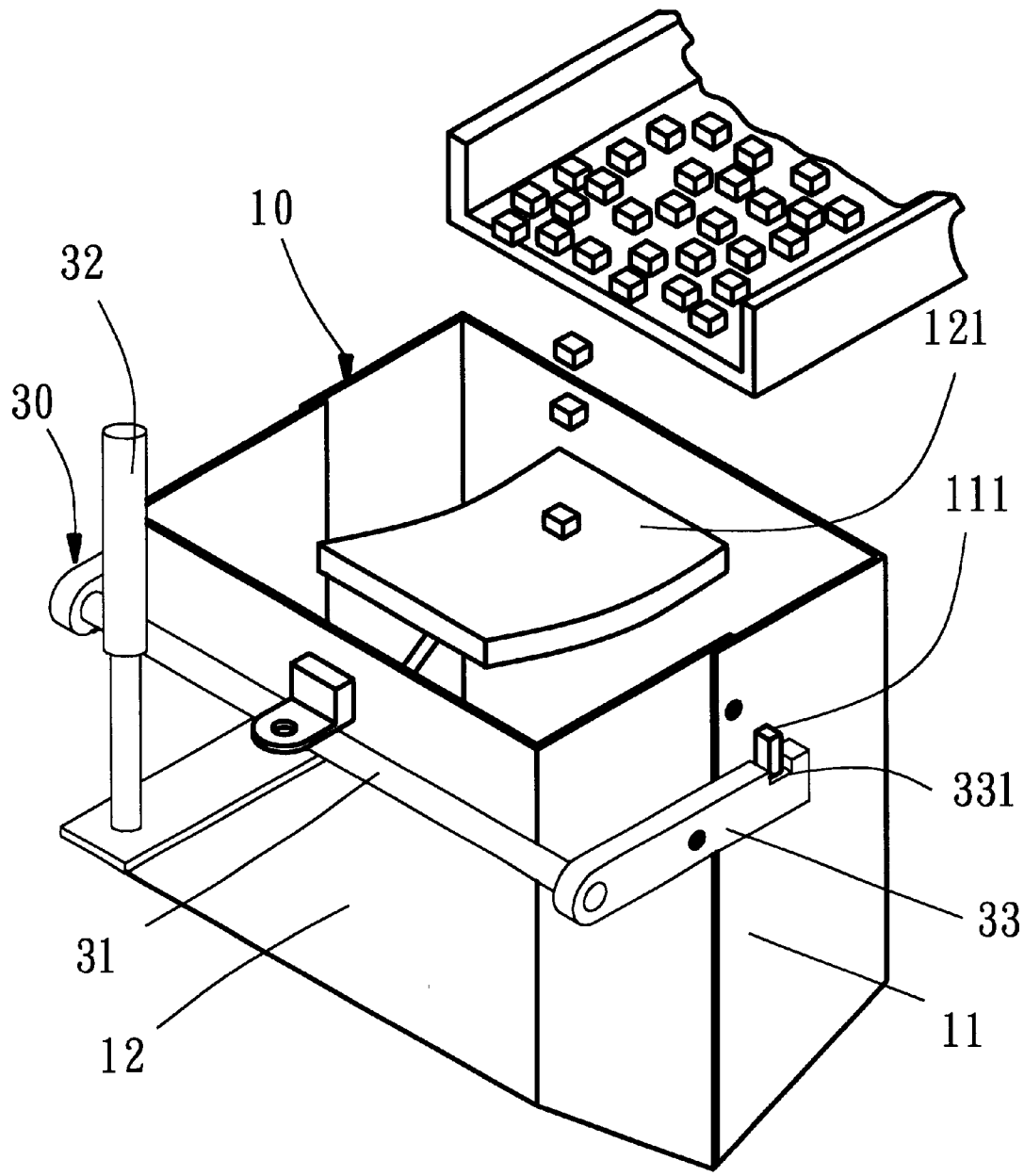
FIG. 4 is a perspective view of a metering device according to the present invention.
Figure 5:
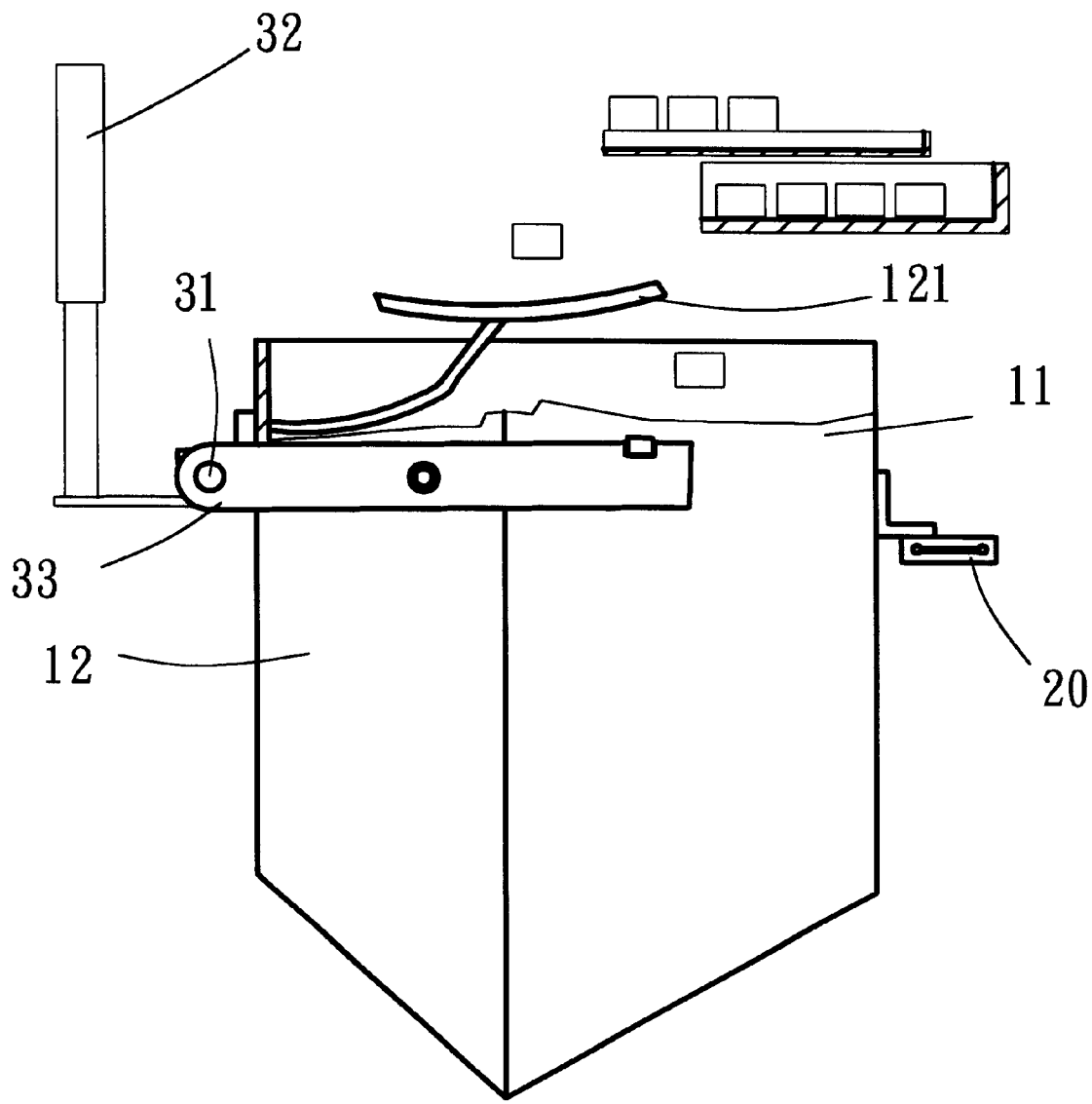
FIG. 5 is a partly plan view of the metering device shown in FIG. 4.
Figure 6:
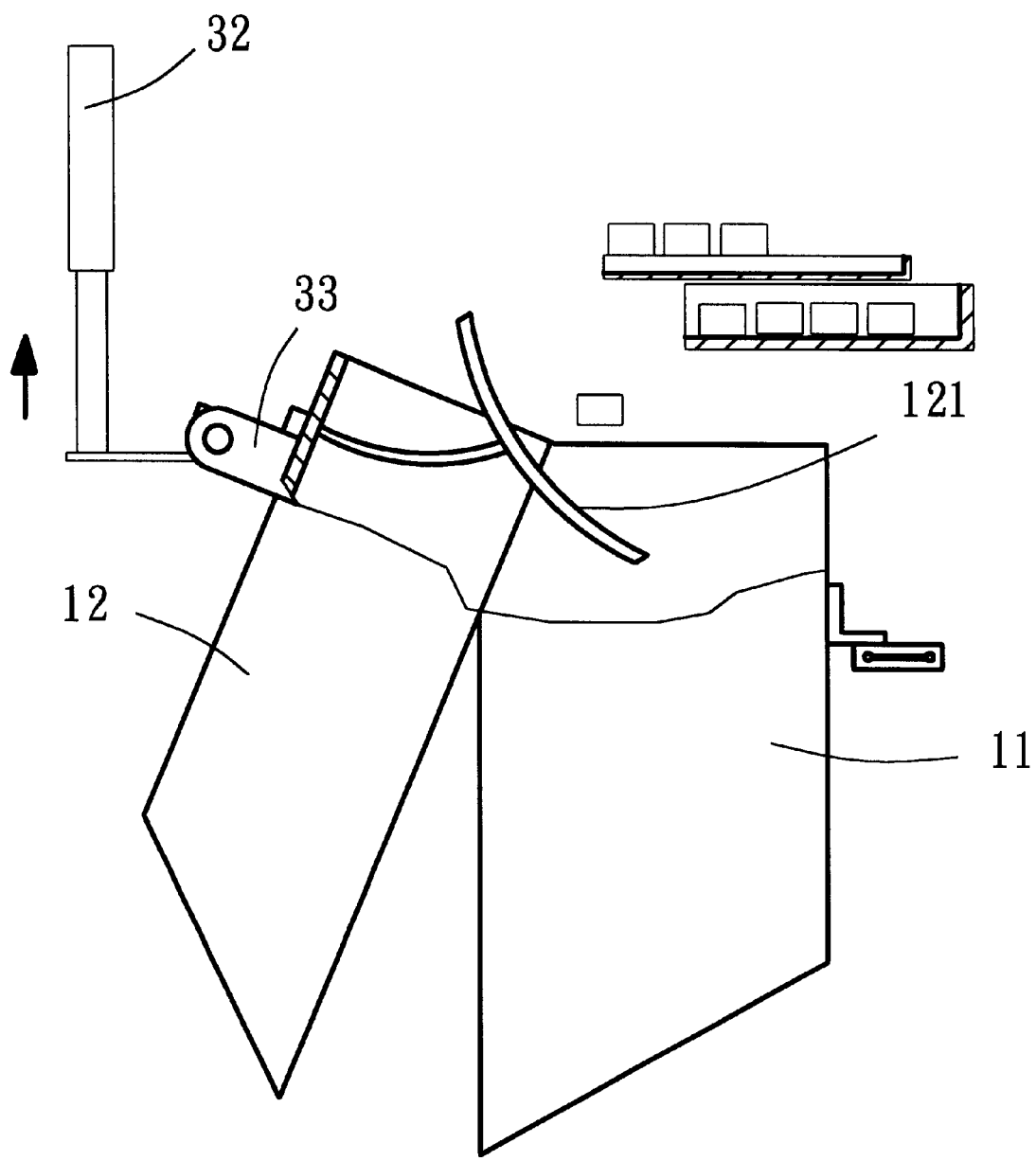
FIG. 6 is a partly plan view similar to FIG. 5 illustrating a scale barrel therein being in a state of opening.

Referring to FIGS. 4, 5, and 6, a metering device of the present invention comprises a scale barrel 10, a weight part 20, a shut mechanism 30.

The scale barrel 10 is composed of a stationary box plate 11 and a movable box plate 12 pivotally connecting with each other. The movable box plate 12 at the inner side thereof is provided with a weighing platform 121 having a proper size and being disposed at a proper height. The stationary box plate 11 at the outer side thereof may provide a projecting piece 111 for limiting the movable box plate 12 in place in case of the movable box plate 12 being in a stet of closing.

The weight part 20 is disposed at a lateral side of the stationary box plate 11 to measure the weight of a weighed substance coming into the scale barrel 10.

The shut mechanism 30 is composed of a moving rod 31 and a driving part 32. The driving part 32 may be an air cylinder or an eccentric mechanism, which are possible to generate a displacement, and an end thereof connects with the moving rod 31 via a connecting arm. The moving rod 31 is properly disposed outside the movable box plate 12 and both ends thereof are pivotally attached a connecting lever 33 respectively extending along both lateral sides of the movable box plate 12. Each connecting lever 33 at the free end thereof is provided with a groove 331 to contact with the limit piece 111 at the time of the scale barrel 10 being closed.

When the driving part 32 such as the air cylinder or the eccentric mechanism is actuated to shut the movable box plate 12, the weighed substances are delivered in a fast speed to fall into the scale barrel 10. The weight part 20 beside the scale barrel 10 may sense the weight of weighed substances in the scale barrel 10. Once a measured value of weight is close to a predetermined value, the feeding mechanism is slow down to decrease the delivering speed such that a very small amount of weighed substances or a single weighed substance may be sent out till the predetermined value is reached. The driving part 32 is then actuated to move the moving rod 31 such that the movable box plate 12 can be opened or closed to allow the weighed substances falling down to a packing bag. In this way, the weighing operation is complete. Because the weighed substances fall down to the scale platform 121 first during being sent by the feeding mechanism, it provides a smaller difference of elevation between the feeding mechanism and the scale platform 121. Hence, the weight of weighed substances can be sensed quickly by the weight part 20 so as to obtain an accurate and easily controlled measurement. When the movable box plate 12 is shut by way of actuation of the driving part 32, the groove 331 at the free end of the connecting lever 33 receives the projecting limit piece 111 to keep the movable box plate 12 from moving.

Figure 7:
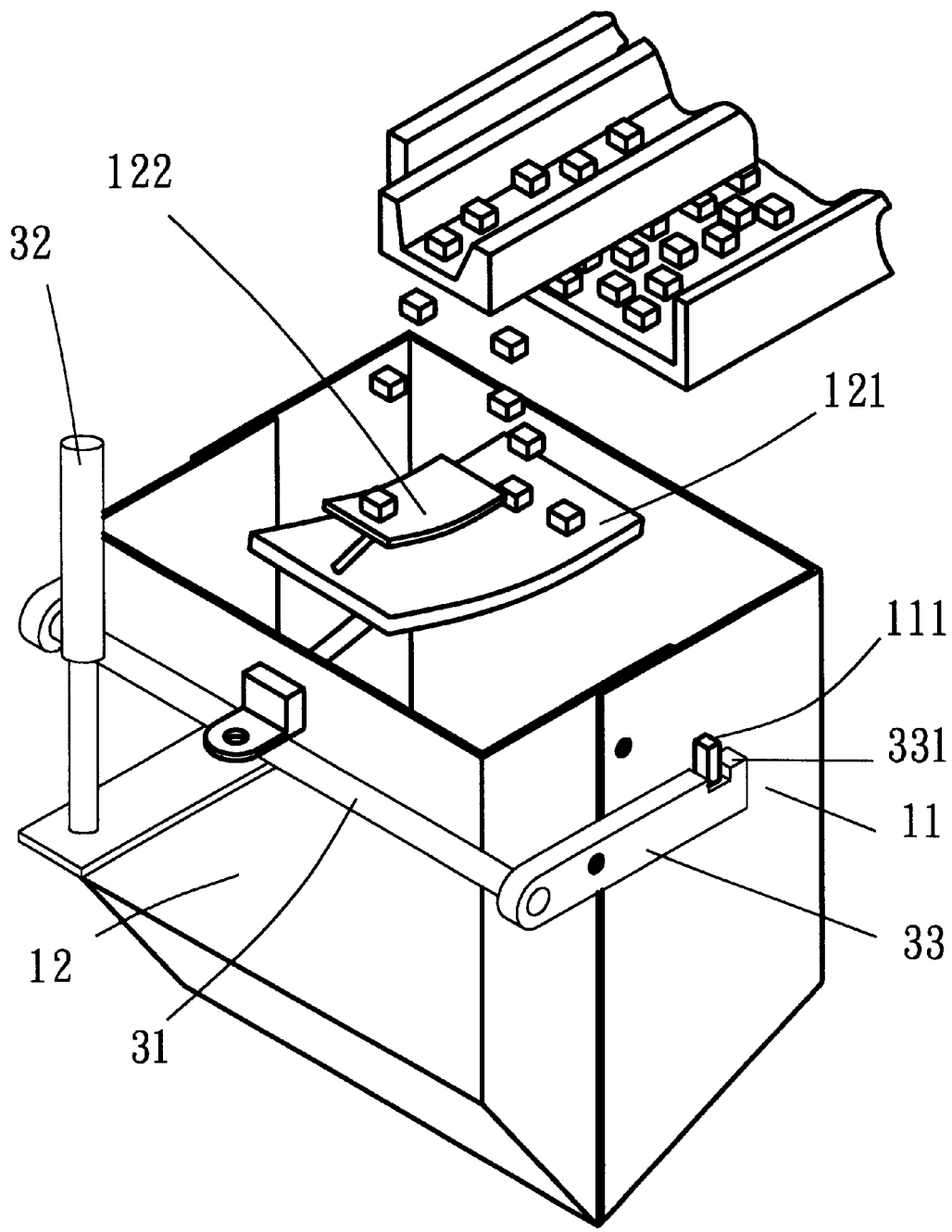
FIG. 7 is a perspective view of a metering device according to the present invention in another embodiment thereof.

Referring to FIG. 7, another embodiment of the present invention shows a small weighing platform 122 is provided above the weighing platform 121 in the movable box plate 12. The weighed substance fed by way of the micro-feeding mechanism may drop down to the small weighing platform 122 instead of the weighing platform 121 to further reduce the difference of elevation. Thus, the weight of the weighed substance can be sensed much more quickly by the weight part 20 to perform a much more accurate and easily controlled measurement.

Figure 8:
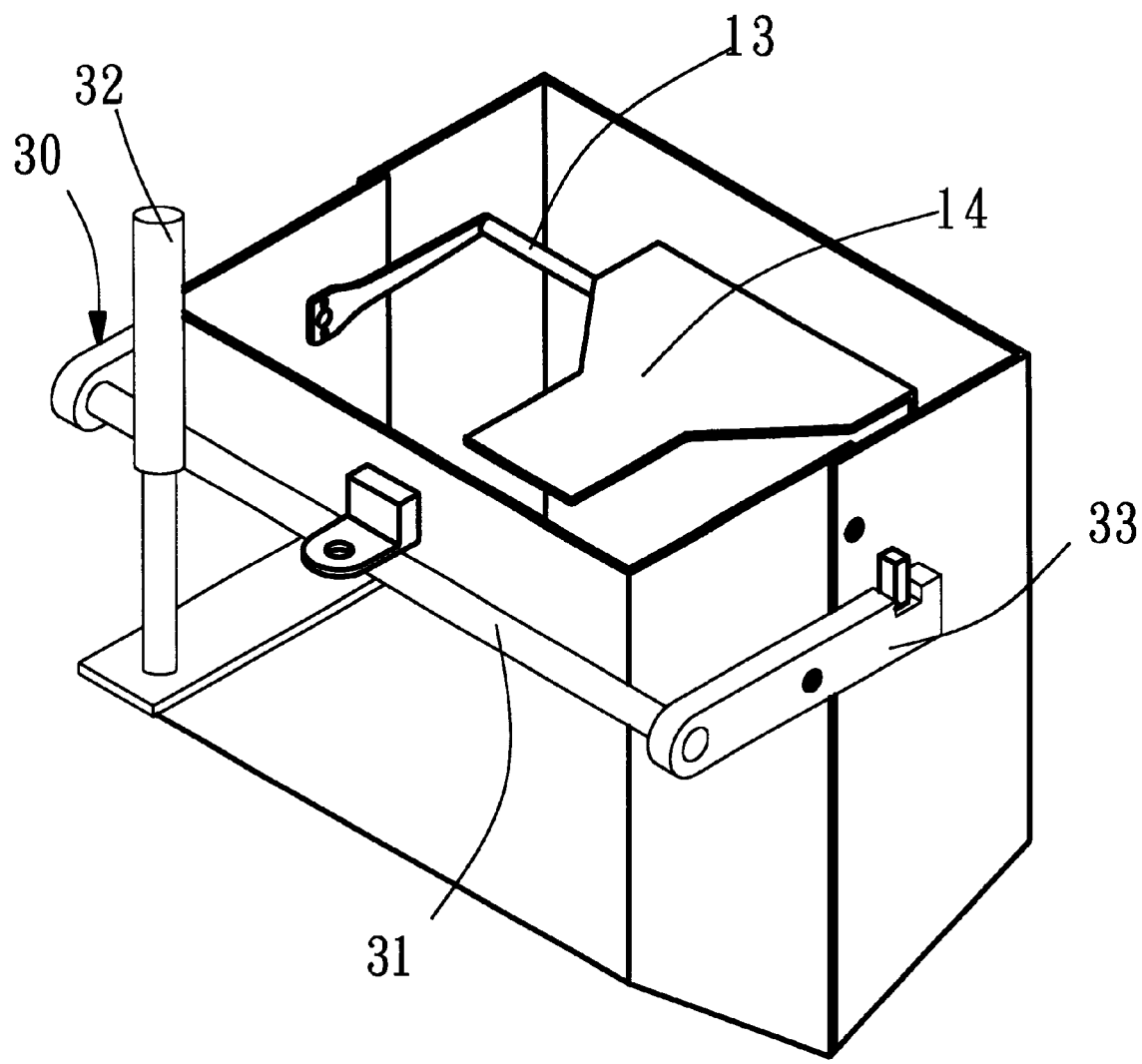
FIG. 8 is a perspective view of a metering device according to the present invention in a further embodiment thereof.
Figure 9:
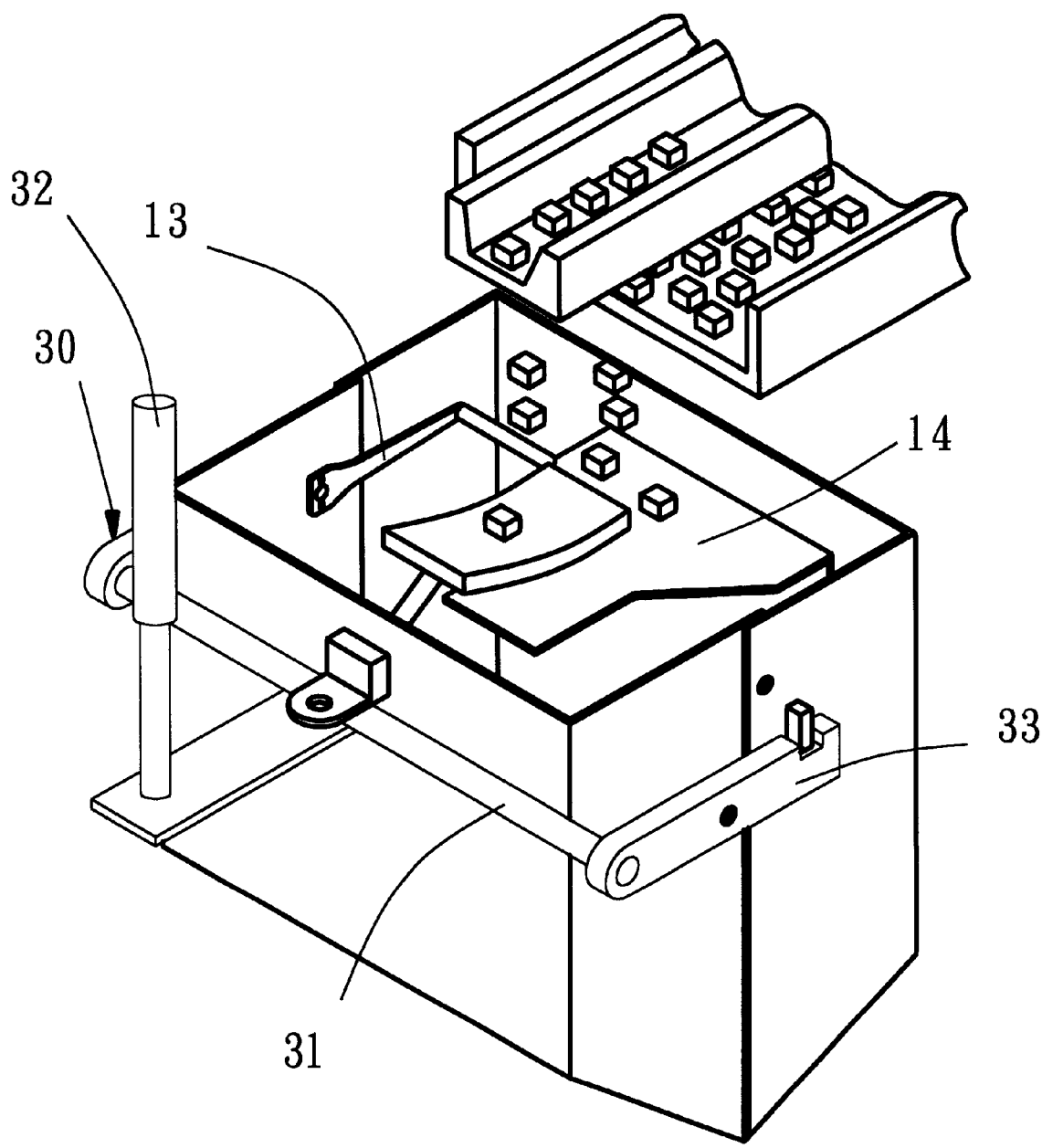
FIG. 9 is a perspective view of a metering device according to the present invention in a further embodiment thereof.

Referring to FIG. 8, a further embodiment of the present invention shows a weighing platform 14 is pivotally mounted in the scale barrel 10 and support by a swing arm 13 pivotally attached to the movable box plate 12 at both lateral sides thereof. When the weighed substance is sent out in a slow speed to drop down to the weighing platform 14, a reduced difference of elevation makes the weight part 20 quickly sense the weight of weighed substances to obtain a much more accurate and easily controlled measurement. FIG. 9 shows a small weighing platform 122 to which the weighed substance may drop down first to further reduce the difference of elevation. Thus, the weight part 20 can sense the weight of the weighed substances much more quickly to obtain a much more accurate and easily controlled measurement.

Figure 10:
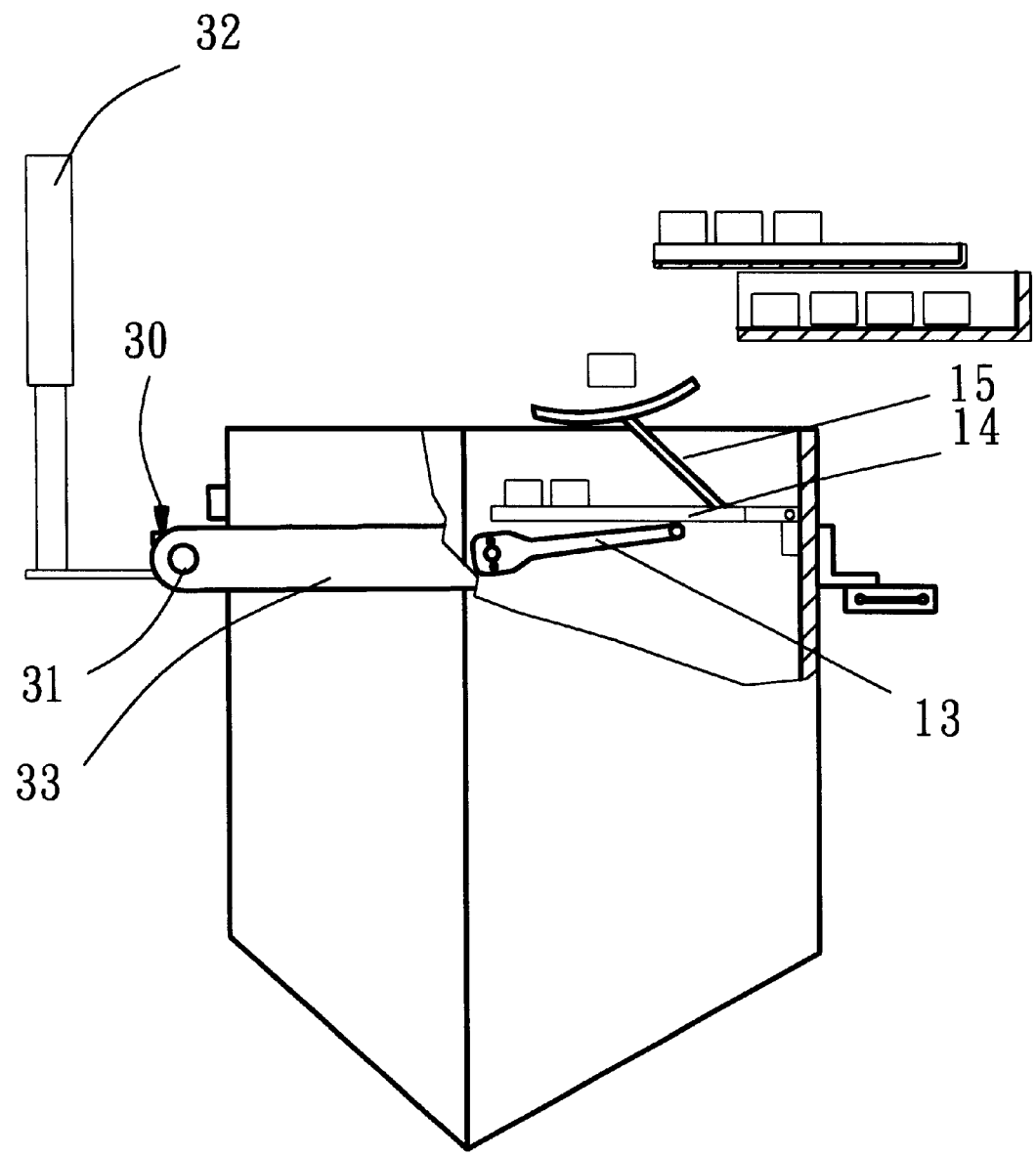
FIG. 10 is a partly plan view of the metering device shown in FIG. 9.
Figure 11:
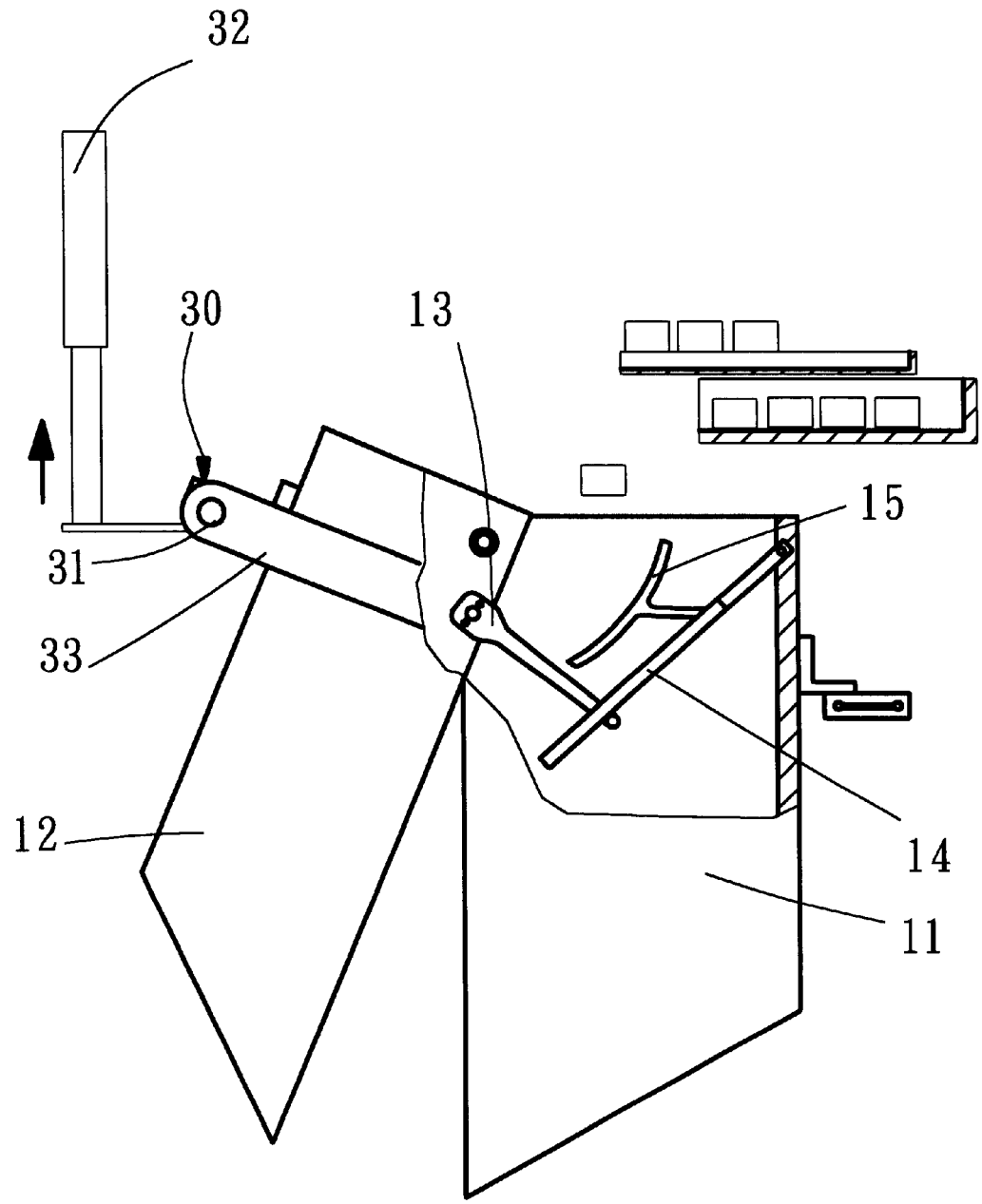
FIG. 11 is a partly plan view similar to FIG. 10 illustrating a scale barrel therein being in a state of opening.

Referring to FIGS. 10 and 11, a weighing platform 14 is disposed in the scale barrel 10 and supported by two swing arms 13 pivotally attached to the movable box plate 12. A small weighing platform 15 is provided above the weighing plate 14 and the weighed substance sent out by way of micro-feeding device may drop down to the small weighing platform 15 to reduce the difference of elevation. Thus, the weight part 20 can sense the weight of weighed substances to reach a much more accurate and easily controlled measurement.

While the invention has been described with reference to preferred embodiments thereof, it is to be understood that modifications or variations may be easily made without departing from the spirit of this invention, which is defined by the appended claims.

What is claimed is:

1. A metering device, comprising:
   a scale barrel with a lateral side, being composed of a stationary box plate and a movable box plate;
   a weight part, being disposed at the lateral side of the scale barrel for measuring weighed substances sent into the scale barrel; and
   a shut mechanism, being composed of a driving part, a moving rod and two connecting levers, and being disposed outside the moving the movable box;
   characterized in that the stationary box plate providing a projecting limit piece at an outer surface of the opposite lateral walls respectively; the connecting levers, being disposed at two opposite sides of the movable plate with each of the connecting levers at an end thereof being fixedly attached to two ends of the moving rod respectively, at a middle part thereof being pivotally fixed to the movable box plate, and at another end thereof having a groove; and the driving part is connected to the moving rod by way of a connecting arm;
   whereby, while the driving part is actuated to move the moving rod upward, the movable box plate at a lower end thereof moves away the stationary box plate to leave an opening and weighed substances in the scale barrel can fall down to enter a packing bag through the opening; and while the driving part is actuated to move the moving rod downward, the movable box plate at the lower end thereof moves to the stationary box plate with the limit pieces fitting with the groove on the respective connecting lever and weighed substances can be received in scale barrel before a predetermined amount of the weighed substances being reached.

2. The metering device as defined in claim 1, wherein a weighing platform is attached to the movable plate.

3. The metering device as defined in claim 2, wherein a small weighing platform is disposed above the weighing platform in the scale barrel.

* * * * *